(12) United States Patent
Kasetty

(10) Patent No.: US 6,307,718 B1
(45) Date of Patent: *Oct. 23, 2001

(54) TAPE HEAD POSITIONING DEVICE FOR ADJUSTING AZIMUTH HEAD TILT

(75) Inventor: Kumaraswamy Kasetty, Northboro, MA (US)

(73) Assignee: Quantum Corporation, Milpitas, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,477

(22) Filed: Aug. 26, 1997

Related U.S. Application Data (63) Continuation of application No. 08/557,662, filed on Nov. 13, 1995, now abandoned.

(51) Int. Cl.[7] ................................................ G11B 5/56
(52) U.S. Cl. ................................ 360/291.1; 360/241.1
(58) Field of Search .................... 360/106, 107, 360/109, 77.12, 78.02, 78.05, 77.13, 290, 241.1, 291, 291.1, 104

(56) References Cited

U.S. PATENT DOCUMENTS

| | | | |
|---|---|---|---|
| 4,071,866 | * | 1/1978 | Butsch .............................. 360/106 |
| 4,101,937 | * | 7/1978 | Jenkins ................................. 360/76 |
| 4,158,868 | * | 6/1979 | Jenkins ............................... 360/109 |
| 4,268,881 | | 5/1981 | Saito .................................... 360/109 |
| 4,392,757 | * | 7/1983 | Denny et al. ....................... 400/328 |
| 4,414,587 | * | 11/1983 | Weaver et al. ....................... 360/76 |
| 4,460,934 | * | 7/1984 | Yamada ............................. 360/123 |
| 4,519,006 | * | 5/1985 | Nakamichi ........................... 360/76 |
| 4,537,367 | * | 8/1985 | Herrington et al. .............. 242/347.1 |
| 4,539,615 | | 9/1985 | Arai et al. ............................ 360/121 |
| 4,586,098 | | 4/1986 | Preto .................................... 360/109 |
| 4,587,581 | * | 5/1986 | Serafini ............................. 360/77.13 |
| 4,609,959 | * | 9/1986 | Rudi .................................... 360/106 |
| 4,616,280 | | 10/1986 | Kobayashi et al. ................. 360/109 |
| 4,623,942 | * | 11/1986 | Kraus et al. .......................... 360/75 |
| 4,639,812 | * | 1/1987 | Nakamichi .......................... 360/126 |
| 4,679,108 | * | 7/1987 | Thomas .......................... 360/130.31 |
| 4,779,149 | * | 10/1988 | Watanabe ............................ 360/109 |
| 4,821,126 | * | 4/1989 | Matsumoto ......................... 360/119 |
| 4,823,221 | * | 4/1989 | McConica et al. .................. 360/125 |
| 4,833,557 | * | 5/1989 | Maeda ................................. 360/106 |
| 4,943,877 | * | 7/1990 | Cannon et al. ...................... 360/106 |
| 5,051,849 | * | 9/1991 | Fukushima et al. ................ 360/72.1 |
| 5,055,956 | * | 10/1991 | Kaya et al. .......................... 360/109 |
| 5,103,360 | * | 4/1992 | Maeda ................................. 360/105 |
| 5,132,858 | * | 7/1992 | Baheri ................................. 360/109 |
| 5,148,336 | * | 9/1992 | Asai et al. ............................. 360/95 |
| 5,196,680 | * | 3/1993 | Schuder .............................. 360/109 |
| 5,331,490 | * | 7/1994 | Richards et al. .................... 360/109 |
| 5,371,638 | * | 12/1994 | Saliba ............................... 360/77.12 |
| 5,379,170 | * | 1/1995 | Schwarz .............................. 360/109 |

(List continued on next page.)

FOREIGN PATENT DOCUMENTS

| | | | |
|---|---|---|---|
| 58-164016 | * | 9/1983 | (JP) . |
| 64-79912 | * | 3/1989 | (JP) . |
| 4-162209 | * | 6/1992 | (JP) . |

*Primary Examiner*—Brian E. Miller
(74) *Attorney, Agent, or Firm*—David B. Harrison; Steven G. Roeder (57) ABSTRACT

A magnetic tape head tilting mechanism for tilting the magnetic head to a desired azimuth angle. The azimuth tilting mechanism uses a worm gear and worm, driven by a stepper motor, which automatically adjusts the position of the magnetic head during recording of the signal onto the tape by the write head gap to maintain the strongest signal that is received by the read head gap. The fine angular resolution enables writing very high track densities and providing strong read signals.

7 Claims, 7 Drawing Sheets

U.S. PATENT DOCUMENTS

| | | | |
|---|---|---|---|
| 5,414,578 | * 5/1995 | Lian et al. | 360/106 |
| 5,432,648 | * 7/1995 | Watanabe et al. | 386/72 |
| 5,434,732 | * 7/1995 | Schwarz et al. | 360/109 |
| 5,438,469 | * 8/1995 | Rudi | 360/109 |
| 5,448,438 | 9/1995 | Kassety | 360/106 |
| 5,450,257 | * 9/1995 | Tran et al. | 360/76 |
| 5,479,307 | * 12/1995 | Lee | 360/109 |
| 5,519,553 | * 5/1996 | Hashimoto et al. | 360/106 |
| 5,552,944 | * 9/1996 | Clemow | 360/76 |
| 5,694,274 | * 12/1997 | Standiford et al. | 360/109 |

* cited by examiner

TAPE HEAD POSITIONING DEVICE FOR ADJUSTING AZIMUTH HEAD TILT

This Application is a continuation of Ser. No. 08/557,662 filed Nov. 13, 1995 now abandoned.

FIELD OF THE INVENTION

The present invention relates generally to the field of magnetic storage devices. More specifically, the present invention relates to an apparatus for azimuth recording and zenith adjusting of a magnetic tape head.

BACKGROUND OF THE INVENTION

Tape recording and reproducing systems for use as computer data storage devices are required to provide high data transfer rates and to perform a read check on all written data. To satisfy these requirements, conventional tape systems employ various methods of recording, including linear recording, in which the tracks of data lie parallel to each other and to the edge of the tape and helical scan recording, in which the tracks of data lie parallel to each other but at an angle to the edge of the tape. The linear recording method offers higher data transfer rates; however, it is desirable to obtain higher data densities while retaining the advantages of this method.

Tape track densities are limited by crosstalk, which occurs when reading is interfered with by data of adjacent tracks. Crosstalk is exacerbated by error in head gap alignments.

A method of recording known as azimuth recording has been shown to decrease the effects of crosstalk and thus increase the track density of tape recording systems. Azimuth recording results in a recorded track pattern in which the magnetization directions of adjacent data tracks lie at different azimuth angles relative to each other. This method greatly reduces intertrack crosstalk, enabling tracks to be placed closer together.

Figure 1:
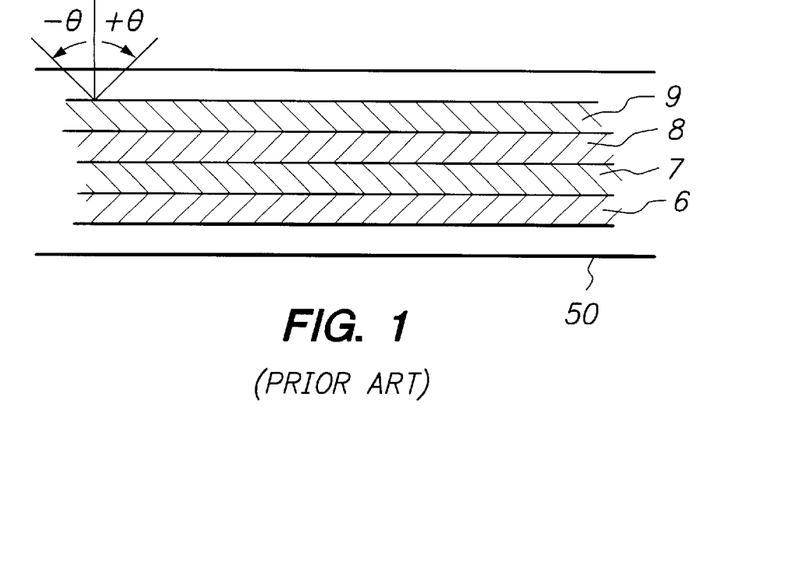
FIG. 1 is a schematic illustration of the magnetization directions of azimuth recording in adjacent tracks.

A typical recorded track pattern resulting from the use of a tape recording system utilizing azimuth recording is shown in FIG. 1. The tracks 7 and 9 are recorded such that the direction of magnetization of the data is at a first angle−theta relative the lateral direction of the tape 50. Tracks 6 and 8 are recorded at a second such angle+theta.

Figure 1A:
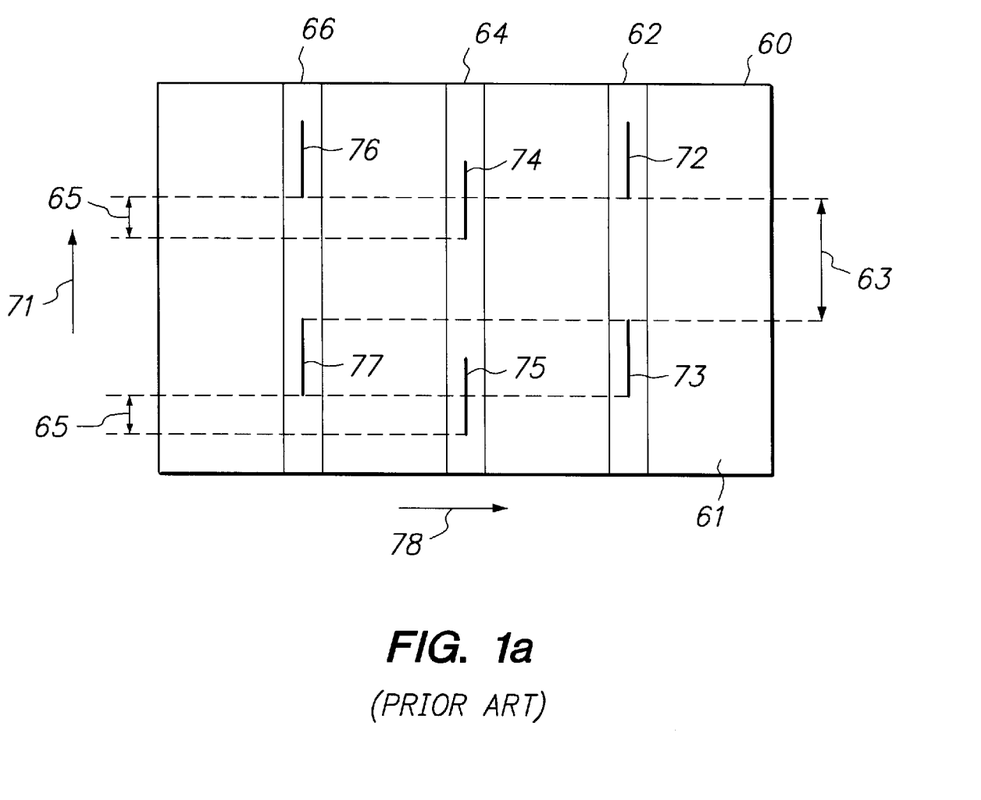
FIG. 1a is a frontal view of a magnetic head face showing a typical head gap arrangement for azimuth recording.

The azimuth recording shown in FIG. 1 is achieved through utilization of a typical magnetic head like the one shown in FIG. 1a. Referring to FIG. 1a, the face 61 of the magnetic head 60 contains a first column 62 of write head gaps 72 and 73, a second column 66 of write head gaps 76 and 77, and a third column 64 of read head gaps 74 and 75 situated between the columns 62 and 66. The head gaps of each column are arranged such that their lengths extend in a lengthwise or longitudinal direction generally parallel to the direction of arrow 71, as shown in FIG. 1a. The write head gaps 72 and 73, the write head gaps 76 and 77, and the read head gaps 74 and 75 are typically arranged such that there is an end-to-end space 63 between them. Further, the corresponding head gaps in columns 62 and 66 are positioned such that the write head gaps 72 and 76 are generally laterally aligned. The read head gaps 74 and 75 in the third column 64 are offset in a lengthwise direction and distance 65 from the corresponding write head gaps in the other two columns 62 and 66. In this arrangement, magnetic head 60 enables azimuth recording of multiple tracks at once.

Figure 1B:
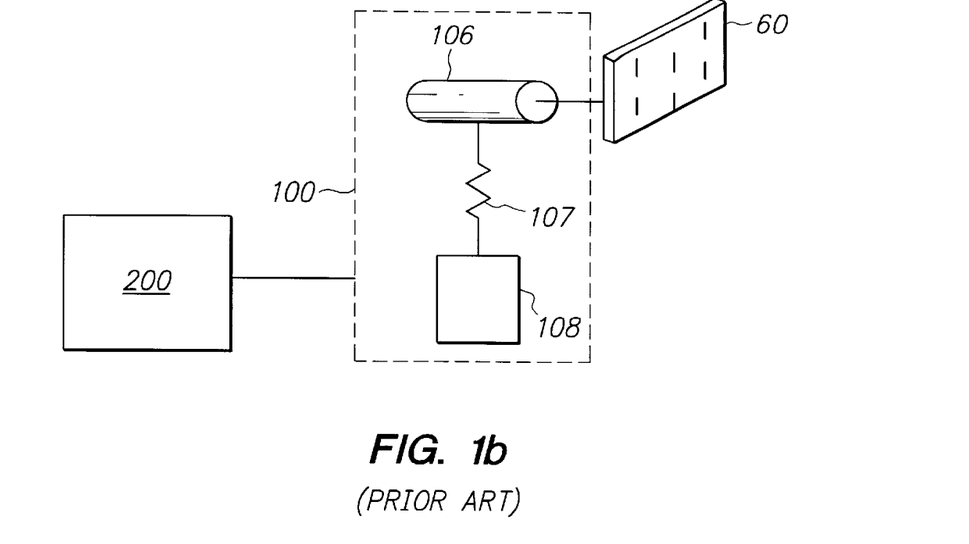
FIG. 1b is a schematic representation of the components of a conventional magnetic head assembly for azimuth recording.

As shown in FIG. 1b, magnetic head 60 is typically mounted on head assembly 100, as shown in dashed lines in FIG. 1b, for lateral and stepped rotatable movement relative to a tape such as that shown in FIG. 1. As shown, the magnetic head 60 is mounted for movement about the output shaft of a rotary motor 106. The rotary motor 106, which receives input from a controller 200, serves to rotatably step the angle of magnetic head 60 relative to the tape 50. A stepper motor 108, which also receives signals from the controller 200, serves to engage an actuator 107, shown as a linear actuator in FIG. 1b, for moving the magnetic head 60 in a lateral or widthwise direction across the tape 50.

Figure 1C:
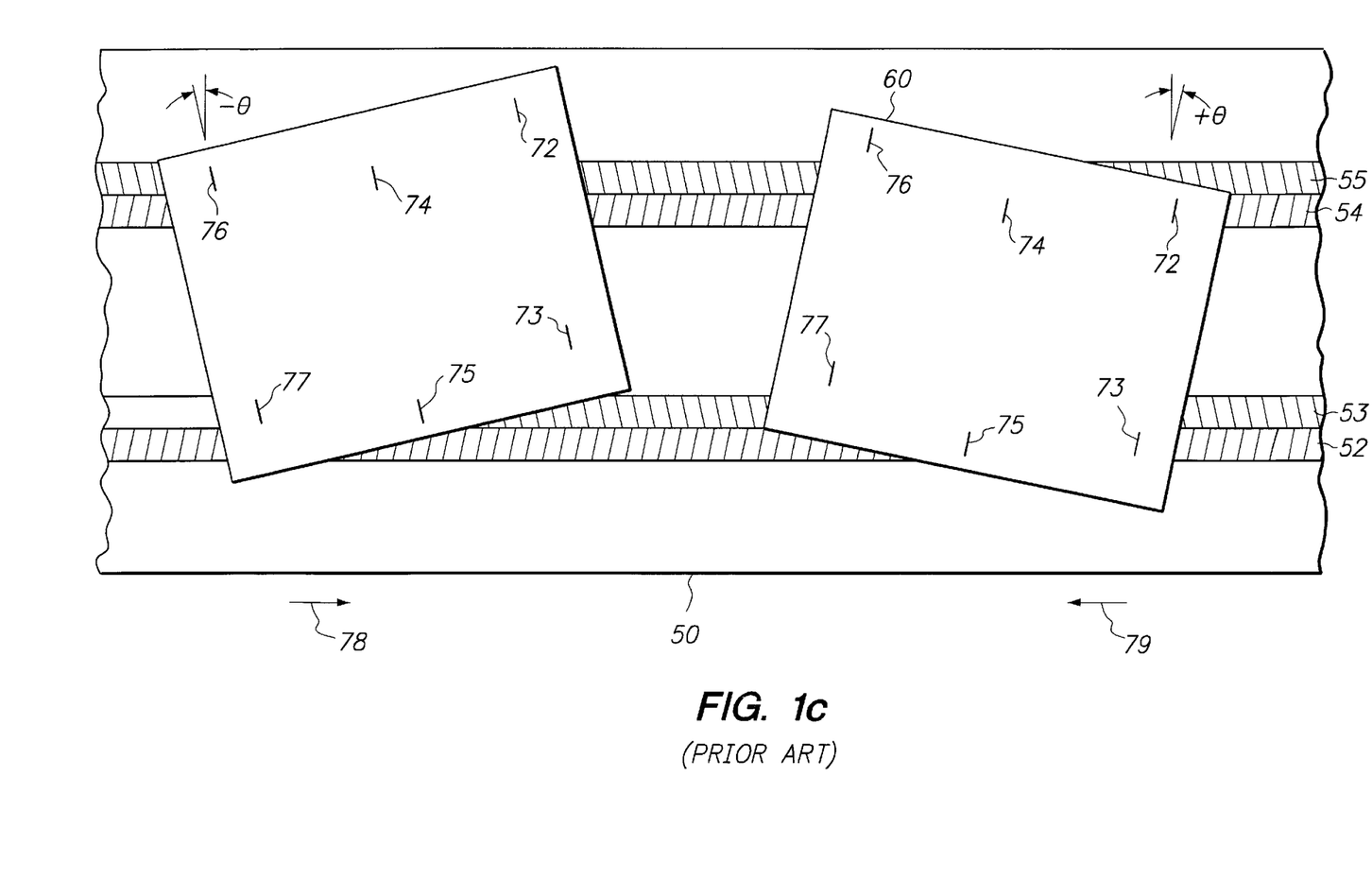
FIG. 1c is a schematic representation of the positioning of the magnetic head of FIG. 1a for writing an azimuth track pattern.

Referring to FIG. 1c, during operation of a typical azimuth recording system, the magnetic tape 50 moves in a direction indicated by the arrow 79 over the magnetic head 60. As shown on the right side of FIG. 1c, the magnetic head 60 is rotated in a positive angle relative to tape 50, denoted by +theta, bringing the write and read head gap pairs 72 and 74, and 73 and 75, into general alignment with tracks 52 and 54, respectively. Write head gaps 72 and 73 write tracks 54 and 52, respectively, on tape 50. These tracks extend generally parallel to the edge of tape 50. In this way tracks are recorded in which the magnetization direction of the data is at a positive azimuth angle on the tape 50.

Referring to FIGS. 1c, when the end of the tape 50 is reached, the direction of travel of the tape 50 is reversed to advance the tape 50 in the direction indicated by the arrow 78. Stepper motor 108 activates linear actuator 107 which moves the magnetic head 60 laterally over the tape 50 to the next track position to be written. The rotary motor 106 rotatably steps the magnetic head 60 to a negative angle, denoted by −theta as shown on the left side of FIG. 1b. This brings the read and write head gap pairs 74 and 76, and 75 and 77, into general alignment with the tracks 55 and 53, respectively. In this position, the write head gaps 76 and 77 write the tracks 55 and 53, respectively, which extend parallel to the edge of the tape 50. These tracks are written at a negative azimuth angle. And again, due to the azimuth position, −theta, of the magnetic head 60, the read head gaps 74 and 75 are able to read check all data written by write head gaps 76 and 77 respectively.

Conventional tape recording systems have employed various azimuth adjustment mechanisms. One such mechanism is disclosed in U.S. Pat. No. 4,539,615 to Arai et al. entitled, "AZIMUTHAL MAGNETIC RECORDING AND REPRODUCING APPARATUS" which describes a stepping motor and a gear box to rotate the magnetic head into the desired azimuth angle. The disadvantages of this type of mechanism, are the physical size of the gear box and the number of gears required to achieve the high gear ratios necessary for high track density recording and reproducing. The gear box decreases the efficiency and lowers the bandwidth of the mechanism, which impedes the performance of the mechanism. Furthermore, the backlash from multiple sets of gears in the gear box will induce inaccuracies in the positioning of the tracks making high track densities difficult to achieve. Backlash is created by the loss of contact between gears during changes of rotational direction. During starting and reversing of gears, backlash creates inaccuracy, particularly in a gear box, wherein backlash has a cumulative effect from each gear. Bandwidth measures the speed with which gears can change directions of rotation. Generally, smaller gears and lesser number of gears perform at higher bandwidths and are thus more desired.

As tape recording systems become increasingly smaller and the track density becomes increasingly greater, the need to limit the physical size and backlash as well as the need to increase bandwidth of head actuation mechanisms becomes critical.

In any method of tape recording, it is highly essential to position the magnetic head such that the face of the head exhibits a zero zenith, i.e. the face of the head is substantially parallel relative to the plane of the tape path. Zero zenith enables the different read/write channels of the head to make uniform and consistent contact with the tape, which enables uniformly strong signals to be read and written. In addition, the different read/write channels of the head will remain in uniform contact with the tape as the head moves up and down along the transverse direction of the tape to read and write different tracks.

Figure 2:
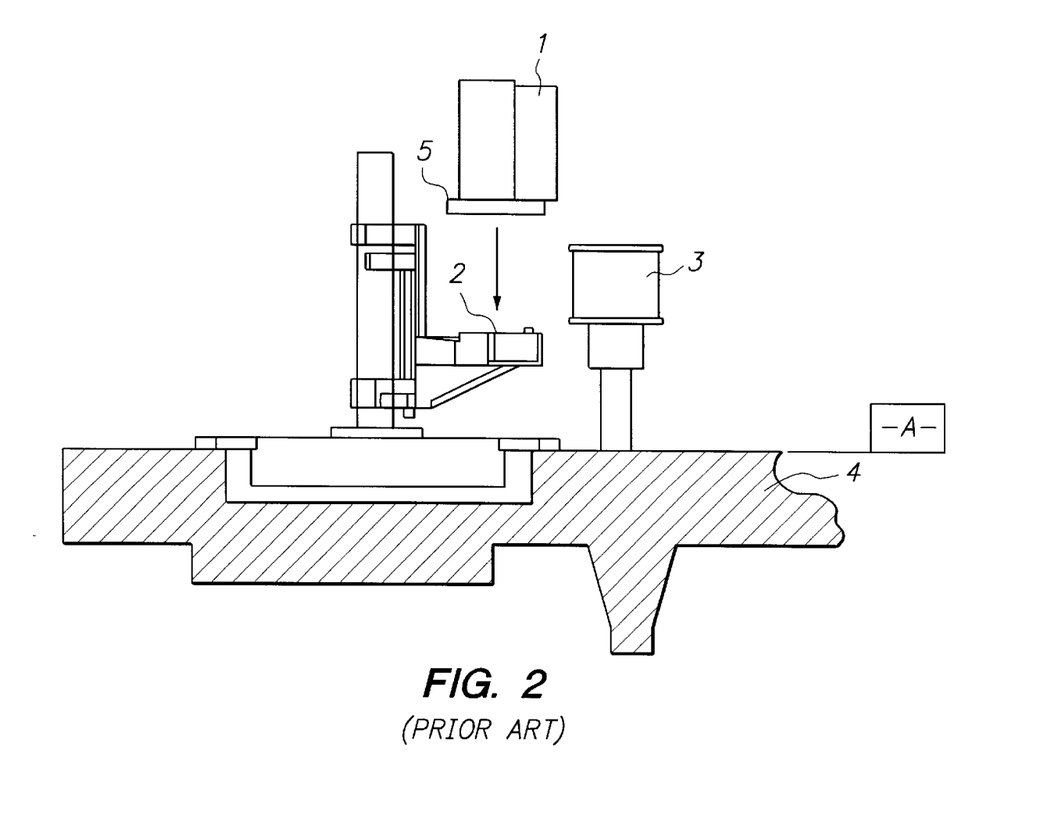
FIG. 2 shows a prior art method of setting the zenith of a magnetic head.

In the prior art, proper zenith of the head was achieved by tightly controlling all the mounting surfaces to very tight tolerances. For example, FIG. 2 shows a tape guide system 3 and a vertically moveable platform 2 on which a read/write head 1 is mounted. The platform 2 is first aligned parallel to datum A of the baseplate. The tape guide system 3 is then aligned perpendicular to datum A. The read/write head 1 is then aligned perpendicular to its mounting surface 5 which is mounted onto platform 2. Thus when all three components are aligned, the zenith may still be off by as much as the sum of all the allowable tolerances in the alignment of the three components.

Alternatively, another method of achieving proper zenith in the prior art was to adhesively attach the magnetic head in place after aligning the zenith using gages. The disadvantages of this method are that zenith may still be misaligned once the adhesive shrinks during curing and the amount of time required for this type of process.

Thus, a hitherto unsolved need has remained for a magnetic head tilting mechanism which combines the functions of azimuth and zenith adjustment in a cooperative, synergistic manner and to reduce overall head assembly components count, size, and overall complexity.

SUMMARY OF THE INVENTION

A general object of the present invention is to provide a new and improved head tilting mechanism for obtaining the required azimuth and adjustment mechanism for zenith of a magnetic recording head in a manner overcoming limitations and drawbacks of the prior art.

Another object to the present invention is to provide an azimuth tilting mechanism for a magnetic head using a worm and worm gear to provide a high gear ratio and high angular head tilting resolution required for high track density recording.

A feature of the present invention uses a torsional spring to bias the worm gear against the worm to eliminate backlash.

Another object of the present invention is to provide an azimuth tilting mechanism having a high bandwidth.

Yet another object of the present invention is to provide a zenith adjustment mechanism which eliminates the cumulative tolerances of individual components.

DETAILED DESCRIPTION OF A PREFERRED EMBODIMENT

Figure 3:
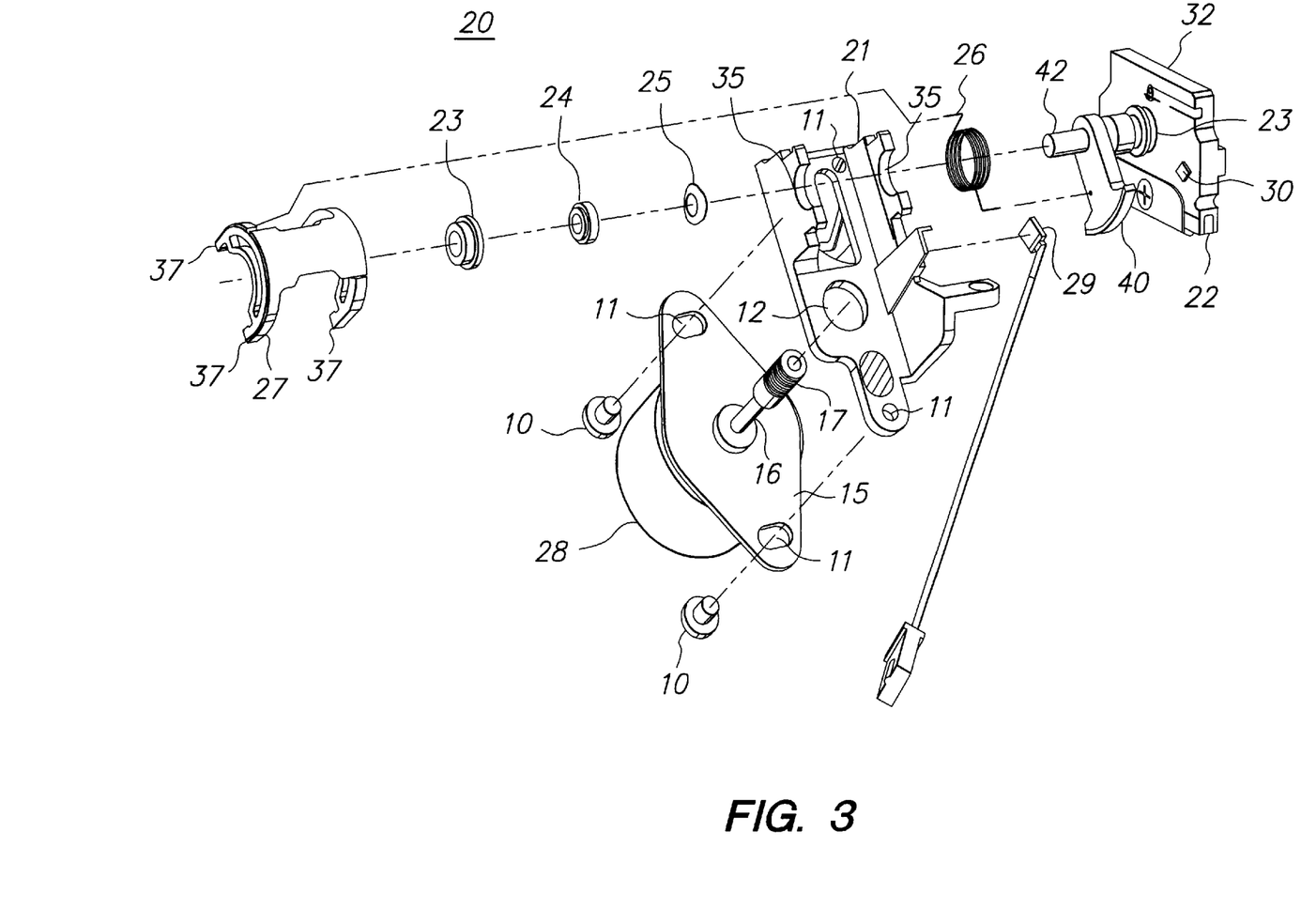
FIG. 3 is an exploded view of the present invention.

FIG. 3 shows an exploded view of the head tilting mechanism 20 of the present invention. The mechanism 20 includes a stepper motor assembly 28, including a motor flange 15, a rotating shaft 16, and a worm 17 attached at the end of the shaft 16. The motor assembly 28 is mounted to a bracket 21 such that the shaft 16 and worm 17 are inserted through a through hole 12 defined in the bracket. The motor 28 is secured to the bracket by set screws 10 which are inserted through aligned holes 11 in the motor flange 15 and the bracket 21.

Worm gear 40 is integrally attached to shaft 42, which is integrally connected to a head plate 32. Worm gear 40 is meshably engaged to the worm 17 and transfers rotational movement from the stepper motor 28 to the magnetic head. Bearings 23 are inserted at both ends of shaft 42 and supports the shaft 42-worm gear 40 assembly in the supporting sections 35 of bracket 21.

In one preferred embodiment, the gear ratio between the worm 17 and the worm gear 40 is approximately 125. Thus, a 7.5 degree step motor driven in a half step mode, would enable the worm gear 40 to rotate the head 33 in 0.03 degree increments, or 0.00015 inches linear resolution. The use of a worm-worm gear assembly achieves a very high gear ratio, which enables a very fine angular and linear resolution without requiring a gear box or a high number of gears.

A torsional spring 26 having one end coupled to the worm gear 40 and the other end coupled to a bearing cap 27, provides a loading force to bias the worm gear 40 into constant contact against the worm 17 to eliminate backlash. The use of one worm gear eliminates the need to use torsional springs on every gear in order to eliminate backlash in a gear box. Furthermore, the use of a single worm gear reduces the overall mass and moment of inertia of the gears, enabling a higher bandwidth.

Figure 4:
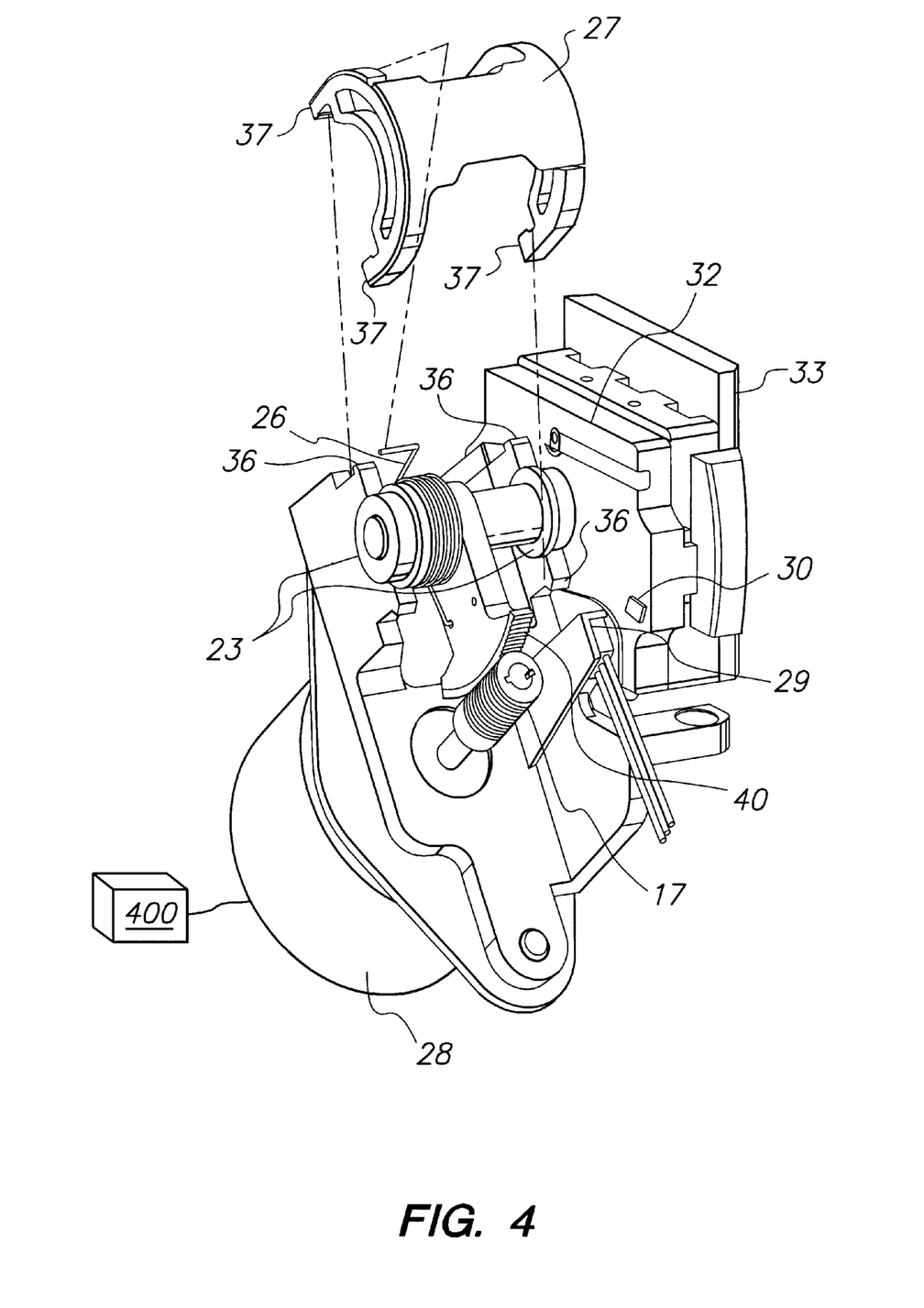
FIG. 4 is an isometric view of the present invention, shown in its assembled form.

As shown in FIG. 4, bearing cap 27 is provided with four legs 37 which snap fit onto mounting tabs 36, formed in bracket 21, to secure the worm gear 40 and shaft 42 against the bracket 21. The bearing cap may be made of plastic or other lightweight material.

Also shown on FIG. 4, is a Hall sensor 29 mounted to the bracket opposite head plate 32. The Hall sensor 29 senses a magnetic field from a small permanent magnet 30, attached to the head plate 32. As the head assembly rotates, relative to the Hall sensor 29, the magnet 30 moves either closer or farther away from the sensor 29. At a predetermined proximity, the magnetic field from the magnet 30 triggers a "high" signal on the Hall sensor 29. Conversely, as the head rotates "away" from the sensor, outside the predetermined proximity, the sensor 29 will shift to a "low" signal. The predetermined proximity will depend on the strength of the magnet and the sensitivity of the sensor. Thus, the signal measured by the Hall sensor 29 provides a reference for determining the initial direction of rotation during power up (explained further below).

Figure 5:
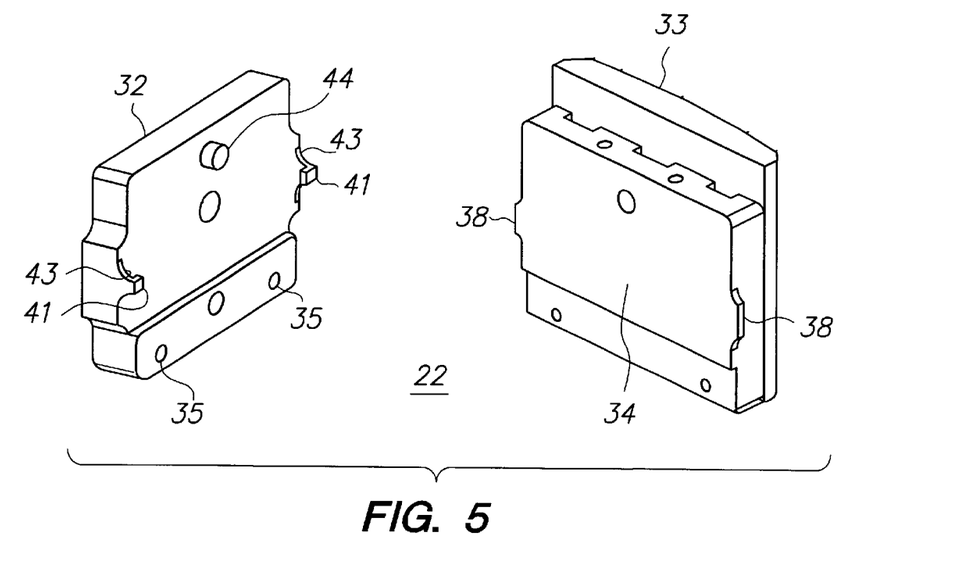
FIG. 5 is an exploded isometric view of the magnetic head assembly.

Referring to FIG. 5, magnetic head assembly 22 includes head plate 32 and magnetic read/write head 33 integrally attached to head backing plate 34. The head plate 32 is provided with a pair of channeled pivot points 41, located along a transverse axis of the head plate, i.e. in the same direction as the plane of tape travel. The channels 43 are formed to accept the side flanges 38 formed in head backing plate 34, which are inserted therein. Further, an adjustment screw 44 is located a distance away from the center axis of rotation of the head plate, along a longitudinal axis i.e. perpendicular to the plane of tape travel for adjusting the zenith of the head 33. In addition, a pair of spring loaded steel balls 45 are partially embedded at the base of the head plate 32, i.e. on the opposite side of the adjustment screw, to bias the magnetic head 33 against the adjustment screw 44.

Figure 6:
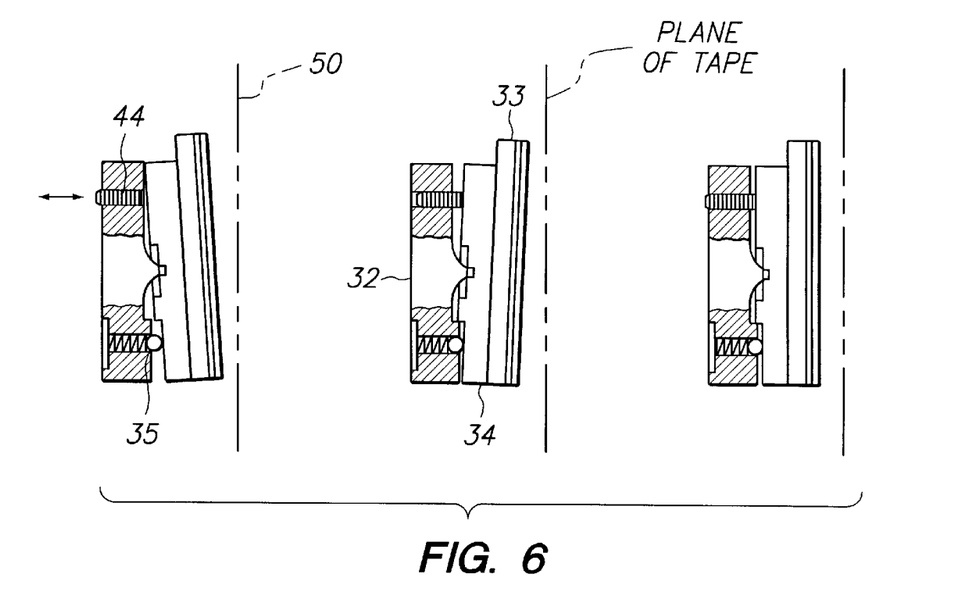
FIG. 6 is a partial cross sectional view of the magnetic head assembly illustrating the procedure for zenith adjustment of the present invention, shown with the magnetic head mounted thereon.

As illustrated in FIG. 6, as the adjustment screw 44 is turned, the head 33 rotates about the pivot points 41 along the transverse axis, is biased in constant contact against steel balls 45, and enables the face of the magnetic head 33 to be aligned parallel to the plane of tape 50. The zenith may be properly set by measuring the signal strengths of various tracks on a pre-written tape during head alignment procedure. For example, when the signal strength is measured to be relatively uniform across the width of the pre-written tape, head zenith will be properly zeroed.

The head backing plate 34 as well as the head plate 32 may be machined from aluminum or other lightweight non-ferromagnetic material.

Figure 7:
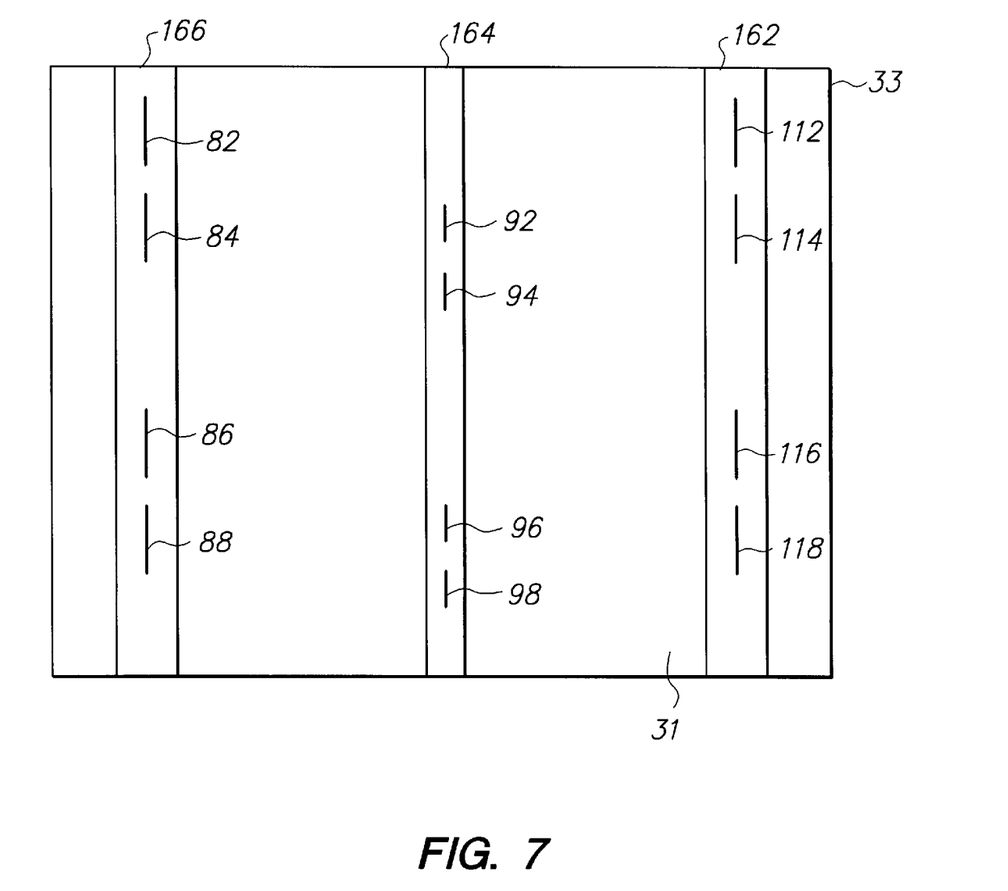
FIG. 7 is a frontal view of the face of the read/write head of FIG. 6.

FIG. 7 shows a frontal view of the face 31 of read/write head 33. The face 31 contains a first column 162 of write head gaps 112, 114, 116, and 118, a second column 166 of write head gaps 82, 84, 86, and 88, and a third column 164 of read head gaps 92, 94, 96, and 98 situated between columns 162 and 166. In the preferred embodiment, this configuration enables four channel azimuth recording, at the azimuth angle of approximately 9.4°. Azimuth recording is performed in both the forward direction, using the write head gaps of column 166, and the backward direction, using the write head gaps of column 162. Furthermore, the head 33 is configured to enable linear recording in both directions.

During operation, the head tilting mechanism of the present invention is assembled in a tape recording system. As previously mentioned, during power up of the system, the Hall sensor 29 provides a reference signal to enable the system to determine the direction of initial rotation. For example, if the Hall sensor 29 measures a "high" signal during power up, stepper motor 28 will rotate in the clockwise direction until the measured signal shifts to a "low". From this "reference position", the system is able to determine a known reference point and the next direction of rotation. Conversely, if the Hall sensor 29 measures a "low" signal during power up, stepper motor 28 will rotate in the counterclockwise direction to the "reference position", i.e. until the signal shifts to a "high".

As stepper motor 28 receives input from a controller 400 (illustrated in FIG. 4), the magnetic head 33 is rotated to the desired azimuth angle. As previously stated, in the preferred embodiment, the optimum azimuth angle is approximately 9.4°. However, after manufacturing tolerances, the actual azimuth angle during operation may deviate. To ensure optimum writing and reading, the actual azimuth angle is determined by monitoring the signal strength measured by the read head gaps 92, 94, 96, and 98. During a read-only of written data, the angular fine resolution of the worm gear enables the head 33 to be incrementally rotated until the strongest signal is measured. In other words, the present invention enables the azimuth angle to be continuously adjusted in response to data signal amplitude.

A tape head actuator similar to the actuator 104 disclosed in commonly assigned U.S. Pat. No. 5,448,438 to Kasetty, entitled "HEAD ACTUATOR HAVING SPRING LOADED SPLIT NUT", supports the magnetic head 60 and serves to move the magnetic head 60 in a lateral or widthwise direction across the tape 50. This patent is incorporated by reference. For very high track density recording, the high gear ratio of the worm gear provides very fine linear resolution required to enable accurate head-to-tape alignment and strong read signals.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A mechanism for reading from and writing to a moving tape with an azimuth recording pattern for a tape drive, the tape moving in a tape plane, the mechanism comprising:

a magnetic head positioned near the tape plane of the tape, the magnetic head including (i) a read head gap that reads a signal from the tape with the azimuth recording pattern, and (ii) a write head gap adapted to record a signal on the tape with the azimuth recording pattern;

a worm gear assembly including a worm and a worm gear mechanically linked to the magnetic head so that rotation of the worm results in rotation of the magnetic head and the head gaps simultaneously about an axis of rotation, the axis of rotation being substantially perpendicular to the tape plane; and a motor mechanically linked to the worm, the motor being adapted to rotate the worm, the magnetic head and the head gaps simultaneously about the axis of rotation to finely adjust the azimuth angle of the magnetic head relative to the tape plane, wherein the motor automatically adjusts the position of the magnetic head and the head gaps about the axis of rotation during recording of the signal onto the tape by the write head gap to maintain the strongest signal that is received by the read head gap.

2. The mechanism of claim 1 wherein the worm gear assembly includes a torsional spring which biases the worm gear into constant contact against the worm to eliminate backlash.

3. The mechanism of claim 2 wherein the gear ratio between the worm and the worm gear is approximately 125.

4. The mechanism of claim 1 wherein the motor includes a stepping motor.

5. A mechanism for reading from and recording to a moving tape with an azimuth recording pattern for a tape drive, the tape moving in a tape plane, the mechanism comprising:

a magnetic head positioned near the tape plane of the tape, the magnetic head including (i) at least one read head gap that reads a signal from the tape with the azimuth recording pattern, and (ii) at least one write head gap adapted to record a signal on the tape with the azimuth recording pattern; and a motor including an output shaft coupled to the magnetic head, the motor being adapted to rotate the magnetic head and the head gaps about an axis of rotation to finely adjust the azimuth angle of the magnetic head relative to the tape plane, the axis of rotation being substantially perpendicular to the tape plane, wherein the motor automatically adjusts the rotational position of the magnetic head and the head gaps during recording of the signal onto the tape by the write-head gaps so that the strongest signal is received by the at least one read head gap.

6. The mechanism of claim 5 including a worm gear assembly including a worm and a worm gear mechanically linked between the output shaft and the magnetic head so that rotation of the output shaft results in rotation of the worm and rotation of the magnetic head and the head gaps about the axis of rotation.

7. The mechanism of claim 5 including a sensor that provides a reference for determining an initial direction of rotation of the motor.

* * * * *